(12) United States Patent
Jang et al.

(10) Patent No.: US 8,228,014 B2
(45) Date of Patent: Jul. 24, 2012

(54) MULTI-PHASE DC/DC BOOST CONVERTER

(75) Inventors: Seok Jang, Irvine, CA (US);
Christopher P. Henze, Lakeville, MN (US); George R. Woody, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 456 days.

(21) Appl. No.: 12/512,156

(22) Filed: Jul. 30, 2009

(65) Prior Publication Data

US 2011/0025248 A1 Feb. 3, 2011

(51) Int. Cl.
*H02P 31/00* (2006.01)
(52) U.S. Cl. ........... 318/521; 318/139; 318/400.02; 318/400.17; 318/729
(58) Field of Classification Search .......... 318/521, 318/139, 400.02, 400.17, 729
See application file for complete search history.

(56) References Cited

U.S. PATENT DOCUMENTS

| | | | | |
|---|---|---|---|---|
| 6,630,804 B2* | 10/2003 | Moriya et al. | ........... | 318/85 |
| 6,867,576 B2* | 3/2005 | Dubhashi | ........... | 324/76.79 |
| 7,443,116 B2* | 10/2008 | Kutsuna et al. | ........... | 318/139 |
| 7,486,036 B2* | 2/2009 | Oyobe et al. | ........... | 318/376 |

\* cited by examiner

*Primary Examiner* — Walter Benson
*Assistant Examiner* — David Luo
(74) *Attorney, Agent, or Firm* — Ingrassia Fisher & Lorenz P.C.

(57) ABSTRACT

A method and an apparatus are provided for balancing current for each of a plurality of similar phases of a DC/DC boost converter. The method includes the step of measuring a voltage drop of each of the plurality of similar phases at predetermined times by measuring the voltage drop across each phase switching device when current is flowing through the switch. The method also includes the steps of calculating current information for each of the plurality of similar phases in response to the voltage drop measured for each of the plurality of similar phases and balancing current for each of the plurality of similar phases in response to the current information of each of the plurality of similar phases.

18 Claims, 3 Drawing Sheets

US 8,228,014 B2

MULTI-PHASE DC/DC BOOST CONVERTER

TECHNICAL FIELD

The present invention generally relates to direct current-to-direct current (DC/DC) converters, and more particularly relates to a multi-phase DC/DC boost converter and its method of operation.

BACKGROUND OF THE INVENTION

In the existing technology, multi-phase direct current-to-direct current (DC/DC) converters, such as boost converters, boost the voltage from an input voltage to an output voltage through multiple phases. Such DC/DC converters are typically utilized in electric motor systems for boosting the voltage from a power storage or generating device to a desired voltage for efficient operation of an inverter and electric motor, such as a permanent magnet motor. Also, such DC/DC converters can be used between multiple power storage devices to match the voltages thereof. Large filter capacitors are costly. A filter capacitor having reduced size and cost can be utilized in DC/DC converters which include multiple phases to reduce current ripple of the input current while increasing a frequency of any remaining current ripple. Such multiple phase DC/DC converters, however, require current balancing to achieve the reduced current ripple with the increased frequency and to share the load evenly among the multiple phases so as to not stress the devices of one or another phase. Conventionally, each phase includes a current sensor for determining the bus current in order to balance the currents in the multiple phases. However, the complexity and cost of multiple current sensors outweighs any filter capacitor cost savings and size reduction attributable to the multiple phase DC/DC converter design.

Accordingly, it is desirable to provide a method and apparatus for balancing the currents of each phase without requiring a current sensor for each phase. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A direct current-to-direct current (DC/DC) boost converter is provided for balancing current for each of a plurality of similar phases thereof. The DC/DC boost converter includes the plurality of similar phases and a boost converter controller. The plurality of similar phases boost a DC voltage provided at an input to the DC/DC boost converter, each of the plurality of similar phases having a current associated therewith and each of the plurality of similar phases including a corresponding one of a plurality of voltage drop measuring devices. The boost converter controller is coupled to the plurality of voltage drop measuring devices for generating and providing gate drive signals thereto and for measuring a voltage drop of each of the plurality of similar phases at predetermined times across each of the voltage drop measuring devices, the boost converter controller calculating current information for each of the plurality of similar phases in response to the voltage drop of each of the plurality of similar phases. The boost converter controller further balances current for each of the plurality of similar phases in response to the voltage drop corresponding thereto.

A method is provided for balancing current for each of a plurality of similar phases of a DC/DC boost converter. The method includes the steps of measuring a voltage drop of each of the plurality of similar phases at predetermined times, calculating current information for each of the plurality of similar phases in response to the voltage drop measured for each of the plurality of similar phases, and balancing current for each of the plurality of similar phases in response to the current information of each of the plurality of similar phases.

An electric motor system is provided, the electric motor system including an electric motor, an inverter, an inverter controller, a first DC voltage source, a DC bus, and a DC/DC boost converter. The inverter is coupled to the electric motor and provides electric control therefore. The inverter controller is coupled to the inverter and generates operational control signals, the inverter controller providing such operational control signals to the inverter. The first DC voltage source generates a first voltage. The DC bus is coupled to the inverter for providing a second voltage thereto for the electric control of the electric motor by the inverter. The DC/DC boost converter is coupled to the DC voltage source for generating the second voltage in response to the first voltage and the first current and providing the second voltage to the DC bus. The DC/DC boost converter includes a plurality of similar phases and a boost converter controller. The plurality of similar phases boost the first voltage to the second voltage, each of the plurality of similar phases having a current associated therewith and each of the plurality of similar phases including a corresponding one of a plurality of voltage drop measuring devices. The boost converter controller is coupled to the plurality of voltage drop measuring devices for generating and providing gate drive signals thereto and for measuring a voltage drop of each of the plurality of similar phases at predetermined times across each of the voltage drop measuring devices. The boost converter controller is also coupled to the plurality of voltage drop measuring devices for calculating current information for each of the plurality of similar phases in response to the voltage drop of each of the plurality of similar phases, the boost converter controller balancing current for each of the plurality of similar phases in response to the current information calculated therefore.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
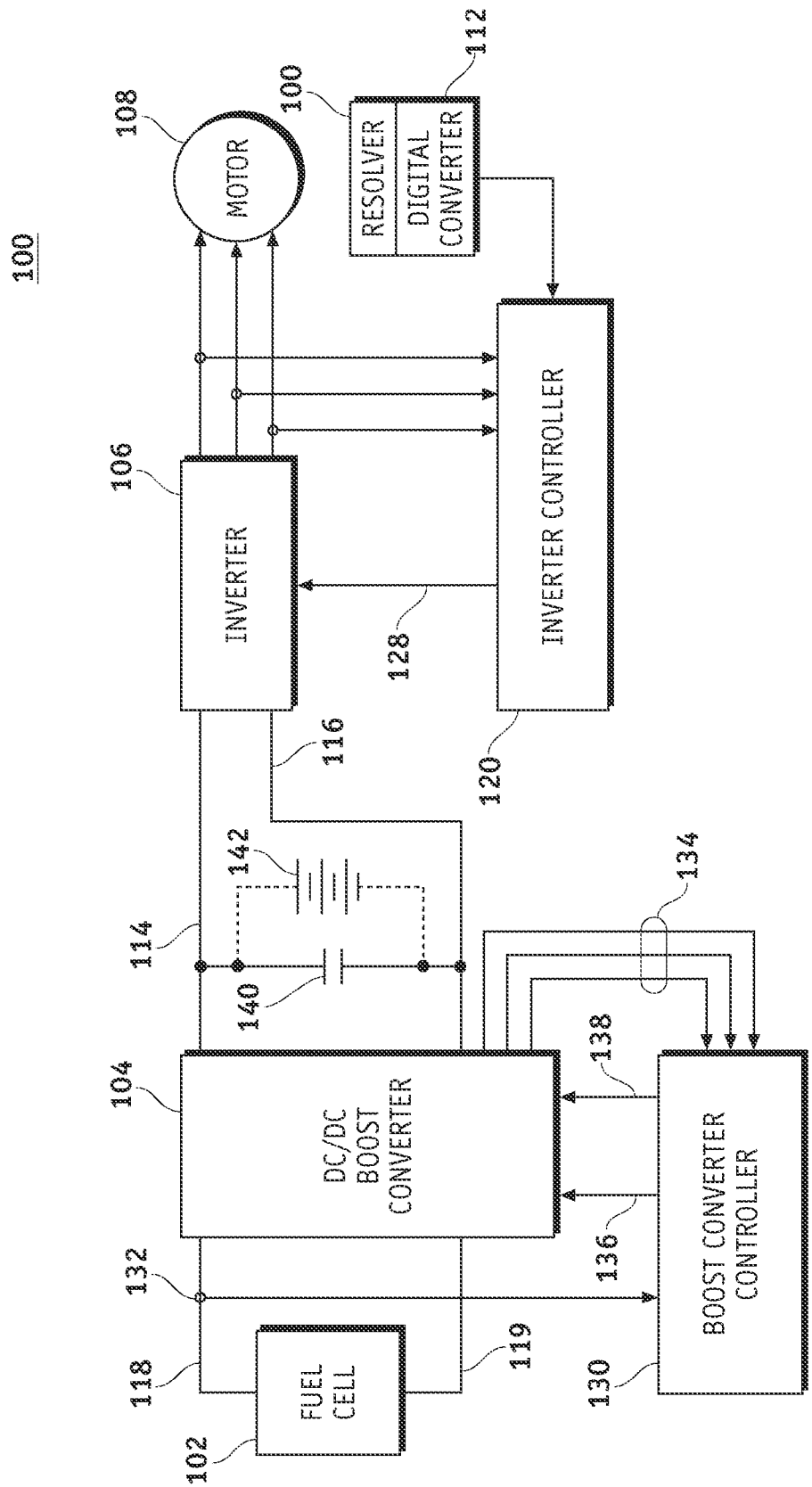
FIG. 1 illustrates a block diagram of an electric motor system in accordance with an embodiment of the present invention.

Referring to FIG. 1, a block diagram of an electric motor system 100 includes a power supplying device 102, such as a fuel cell, coupled to a direct current-to-direct current (DC/DC) boost converter 104 for boosting the voltage from the power supplying device 102 to an operable level for an inverter 106 controlling the operation of a motor 108. A resolver 110 is coupled to the motor 108, such as a permanent magnet electric motor, for detection of rotor position and rotor angular velocity. The resolver 110 provides information on the rotor position and angular velocity to a digital converter 112 which converts the information into digital signals corresponding to the rotor position and angular velocity, providing these digital signals to an inverter controller 120. The inverter controller 120 also receives phase current signals representing the current sensed on the phase control signals provided from the inverter 106 to the motor 108 for control thereof.

The inverter controller 120, in any one of several known techniques, generates operational control signals (typically pulse width modulated operational control signals) from the phase current signals and the digital rotor position and angular velocity signals and provides the operational control signals via lines 128 to the inverter 106 for controlling the operation of the inverter. The inverter 106 receives power from the DC bus 114, 116 which provides boosted DC voltage thereto, the voltage on the DC bus 114, 116 boosted by the DC/DC boost converter 104.

In accordance with the present embodiment, the multiphase DC/DC boost converter 104 boosts a first voltage on bus 118, 119 from the power supplying device 102 to a second voltage on the bus 114, 116. A boost converter controller 130 receives a current sense signal from a single current sensor 132 sensing the total current on the bus 118. While the single current sensor 132 is depicted on the input bus 118 in FIG. 1, a single current sensor on the output bus 114 would also work in accordance with the present embodiment to sense a summed current from each of the phases of the multiphase DC/DC boost converter 104.

The boost converter controller 130 also receives digital compensation signals 134 from the DC/DC boost converter 104. In response to these signals, the boost converter controller 130 generates gate signals 136 and sampling signals 138 for controlling the operation of the multiphase DC/DC boost converter 104 in accordance with the present embodiment to balance the current of the phases of the multiphase DC/DC boost converter 104 to optimize the boosting of the voltage from the bus 118, 119 to the bus 114, 116. Utilization of the multiphase DC/DC boost converter 104 enables cost savings by making possible the use of a reduced cost, reduced size filter capacitor 140 coupled to the output DC bus 114, 116. For additional reduction of the filter capacitor 140, a battery 142 could be connected in parallel with the filter capacitor 140, thereby providing additional cost savings.

Figure 2:
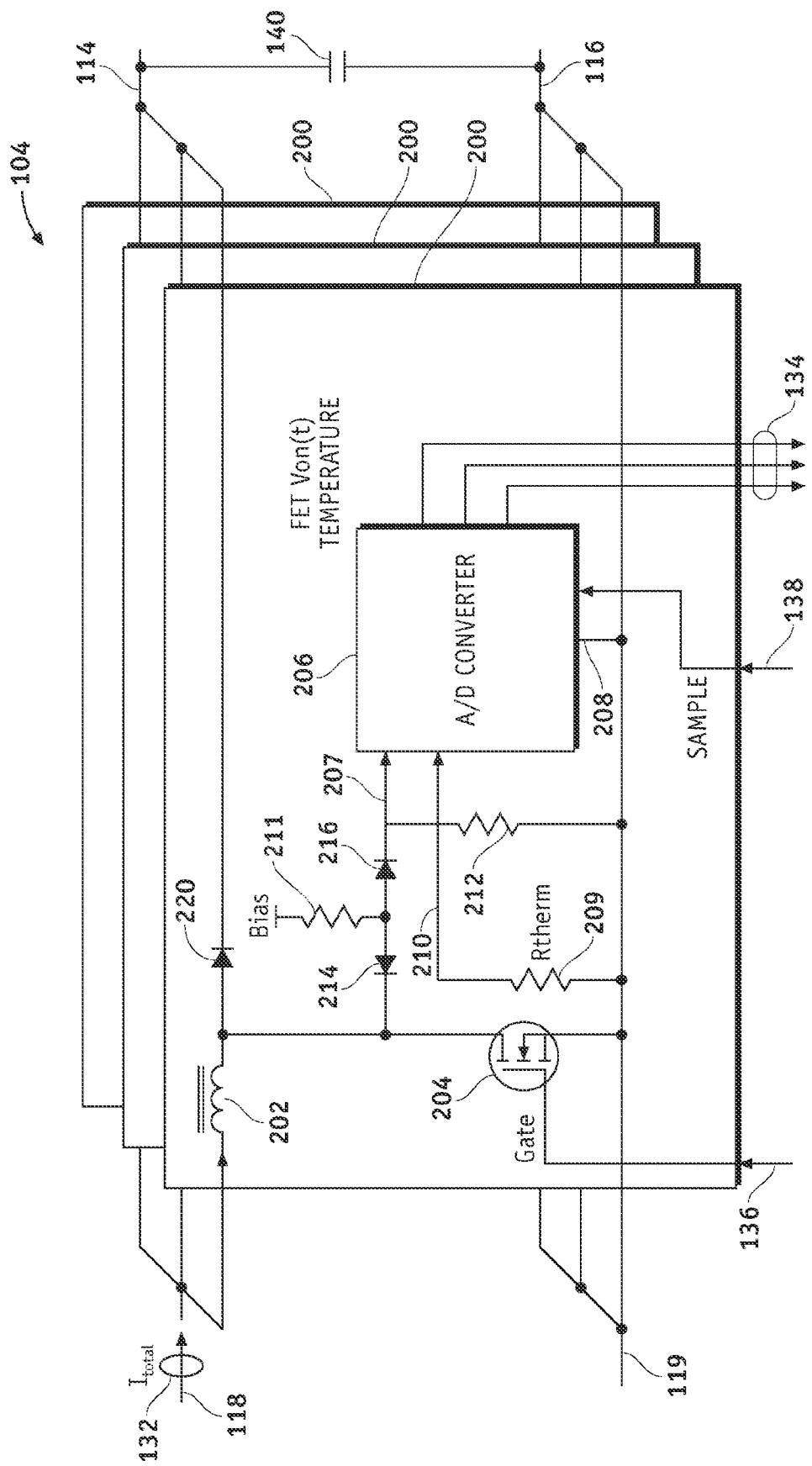
FIG. 2 illustrates a schematic diagram of one phase of a multiphase direct-current-to-direct-current (DC/DC) boost converter for the electric motor system of FIG. 1 in accordance with the embodiment of the present invention.

Referring to FIG. 2, each of a plurality of similar phases 200 of the multi-phase DC/DC boost converter 104 operate to control the total current from the DC/DC boost converter 104 by controlling a proportional current on each of the plurality of similar phases 200. Each of the plurality of phases 200 includes a boost inductor 202 coupled to the input bus 118. By including the boost inductor 202 in each of the plurality of similar phases 200, the size and cost of inductors in the DC/DC boost converter 104 can be reduced. In accordance with the present embodiment, the sum of boost inductors 202 in all of the phases 200 will still be smaller and lower-priced than a single inductor that would be required in the case of a single phase DC/DC converter serving as the DC/DC boost converter 104.

A field effect transistor (FET) 204, such as a Gallium Nitride (GaN) FET, a junction FET or a Metal Oxide Semiconductor FET (MOSFET), is typically used as the main switch for a phase of a DC/DC boost converter and when the FET 204 is switched ON, the FET 204 characteristics become the same as a resistor with a very low resistance, $R_{dsON}$, such as approximately ten milliohms. Thus, in accordance with the present embodiment, the FET 204 also functions as a current measuring device because the voltage drop across the FET 204 when the FET 204 is switched ON is determined by the amount of current that flows through the FET 204. When the FET 204 is switched ON by the gate signal, the small resistance of the FET 204, $R_{dsON}$, is used in accordance with the present embodiment to calculate current information of the corresponding one of the plurality of phases 200 in accordance with Ohms law (see Equation 1 below), thereby eliminating the need to include an expensive current sensor in each of the plurality of phases 200. In this manner, the DC/DC boost converter 104 provides substantial cost savings and occupies less area than a boost converter with a current sensor in each of the phases 200. The current across the FET 204 is calculated when the gate signal 136 switches ON the FET 204 and is shown in Equation 1:

$$I_d = V_{ds}/R_{dsON} \qquad \text{Equation 1}$$

where $I_d$ is the switch current across the FET 204, $V_{ds}$ is the voltage across the FET 204, and $R_{dsON}$ is the very low resistance of the FET 204 as measured when the FET 204 is turned ON.

The boost converter controller 130 receives the digital compensation signals 134 from an analog-to-digital (A/D) converter 206. The voltage drop, $V_{ds}$, is measured by the boost converter controller 130 determining the voltage across the resistor 212 because the voltage across the resistor 212 is same as the voltage drop, $V_{ds}$, of the FET switch 204 when the FET switch 204 is switched ON and both diodes 214 and 216 are conducting. By measuring the voltage drops, $V_{ds}$, across the FET switches 204 of all of the similar phases 200, the currents of each of the phases 200 and a summed current can be calculated by the boost converter controller 130 for balancing of the currents of each of the similar phases 200 without using an expensive current sensor in each of phases 200, thereby reducing the cost of the DC/DC boost converter 104.

The DC/DC boost converter 104, as depicted in FIG. 2, includes additional circuitry for improving the accuracy of current determination in accordance with additional aspects of the present embodiment. A thermistor 209 in each phase 200 acts as a temperature sensing device by providing a resistance which varies with the temperature of the DC/DC boost converter 104. Since the resistance value, $R_{dsON}$, of Equation 1 varies in accordance with the temperature of the phase 200 (specifically the temperature of the transistor 204), a temperature signal representing the temperature of the transistor 204 can be utilized by the boost converter controller 130 to more accurately determine the resistance value, $R_{dsON}$, thereby facilitating more accurate calculation of the current of each of the similar phases 200 by the boost converter controller 130. The thermistor 209 provides a temperature signal 210 to the A/D converter 208 while the voltage drop signal 207 is tapped off the FET 204. The A/D converter 208 also receives the sampling signal 138 from the boost converter controller to measure the voltage drop of each of the plurality of phases 200 at predetermined times and generates output compensation signals 134 in response to the temperature of the DC/DC boost converter 104 and the voltage drop of each of the plurality of phases for utilization by the boost converter controller 130 in control of the plurality of phases 200.

The accuracy of the calculation by the boost converter controller 130 of the current of each of the phases 200 is further enhanced by the boost converter controller 130 utilizing a total current value, $I_{total}$, from the singular current sensor 132. Thus, in accordance with the present embodiment, the boost converter controller 130 calculates current information for each of the plurality of similar phases 200 in response to the output compensation signals 134 which provide a digital representation of a voltage drop of the phase 200 and a temperature thereof, and the current sense signal 132. The current information calculated includes an absolute current for each of the plurality of phases 200 and a summed current for comparison to the total current value, $I_{total}$, provided on the bus 118, 119. The current information is utilized by the boost converter controller 130 to balance a current for each of the plurality of phases 200 by gate signals 136.

In addition to the FET 204 coupled between the buses 118, 119, a resistor 211 coupled between a bias voltage input and the voltage drop signal 207 and a resistor 212 coupled between the bus 119 and the voltage drop signal operate in cooperation with protective diodes 214, 216 to stabilize the voltage drop signal 207 and ensure an accurate voltage drop measurement at the input to the A/D converter at the predetermined sample times. The boost converter controller 130 also determines a ripple current on the bus 118 from the sensed input current signal and further minimizes the effect of the ripple current by calculating the predetermined sample times in response thereto and providing the resultant sampling signals 138 to the A/D converter to measure the voltage drop at a middle of the ripple current.

A bus diode 220 and the filter capacitor 140 operate in conjunction with the gating of the FET 204 by the gate signals 136 to provide balanced current and voltage from the each of the plurality of similar phases 200 of the DC/DC boost converter 104. While a single embodiment has been shown in FIG. 2, those skilled in the art will realize that other circuit elements could be utilized instead of or in accordance with the voltage measuring devices and temperature sensing devices to measure the voltage drop of each of the plurality of similar phases 200 and calculate, in response thereto, current information for balancing the current for each of the plurality of phases 200 in accordance with the present embodiment.

Figure 3:
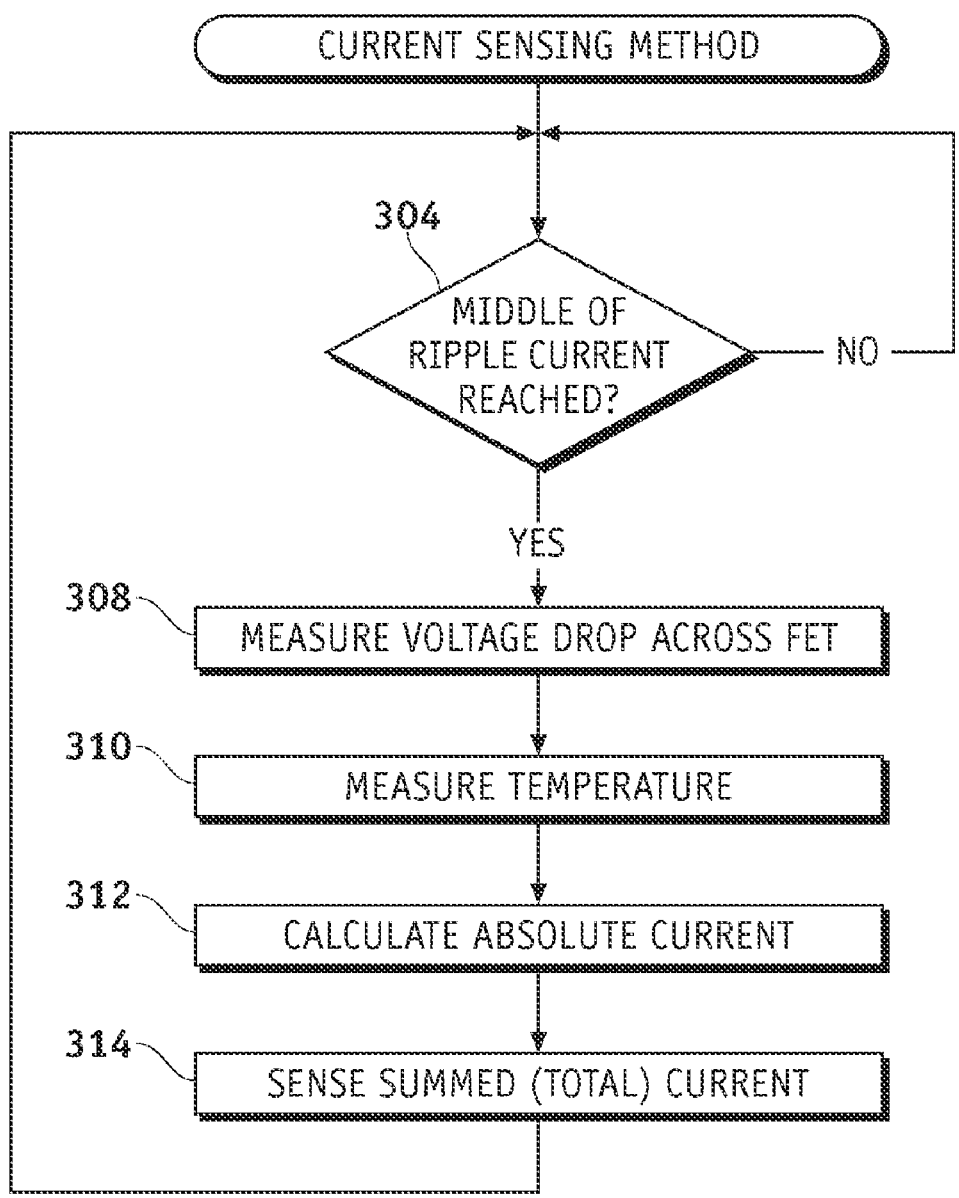
FIG. 3 illustrates a flowchart of an operation of the boost controller for the DC/DC boost converter of FIGS. 1 and 2 in accordance with the embodiment of the present invention.

Referring to FIG. 3, a flowchart 300 of an operation of the boost converter controller 130 in accordance with the embodiment of the present invention begins by the boost converter controller 130 waiting 304 until the current flowing through the FET switch reaches a middle of the ripple current which occurs at the midpoint of the ON period of the FET switch. Operation of the boost converter controller 130 at a predetermined time corresponding to the middle of the ripple current minimizes an effect of the ripple current on the operation of the boost converter controller 130. A typical switching frequency for the sampling signal 138 in accordance with the present embodiment is between fifty and one hundred kilohertz (50 kHz to 100 kHz).

When the current flowing through the FET switch reaches the middle of the ripple current, the boost converter controller 130 provides the sampling signal to the A/D converter 206 to measure the voltage drop across the FET 204 at the midpoint of the ON period for calculation of current information. The boost converter controller 130 also receives signals from the A/D converter 206 corresponding to a measure 310 of the temperature of the DC/DC boost converter 104 as measured by the thermistor 206.

Using the temperature and the voltage drop, the boost converter controller 130 calculates 312 an absolute current and also determines 314 the total input current, utilizing the sensed current signal from the single current sensor 132. As described above, accuracy of the calculation of the current information as well as decreasing the components in each of the plurality of phases 200 can be assured through the use of a single current sensor 132 at either the input bus 118 or the output bus 114.

Thus it can be seen that a DC/DC boost converter 104 can be provided in accordance with the present embodiment the relative current in each phase of the plurality of phases 200 can be calculated for current balancing and a less expensive and smaller sized DC/DC boost converter 130 can be provided.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A direct current-to-direct current (DC/DC) boost converter comprising:
   a plurality of similar phases for boosting a DC voltage provided at an input to the DC/DC boost converter, each of the plurality of similar phases having a current associated therewith and each of the plurality of similar phases including a corresponding one of a plurality of voltage drop measuring devices; and
   a boost converter controller coupled to the plurality of voltage drop measuring devices for generating and providing gate drive signals thereto and for measuring a voltage drop of each of the plurality of similar phases at predetermined times across each of the corresponding ones of the plurality of voltage drop measuring devices, the boost converter controller calculating current information for each of the plurality of similar phases in response to the voltage drop of each of the plurality of similar phases, wherein the boost converter controller balances current for each of the plurality of similar phases in response to the current information of each of the plurality of similar phases,
   wherein each of the plurality of similar phases comprises a temperature sensing device for measuring a temperature thereof, and wherein the boost converter controller is coupled to the temperature sensing device of each of the plurality of similar phases and calculates the current information of each phase of the plurality of similar phases in response to the measured temperature and the measured voltage drop thereof.

2. The DC/DC boost converter in accordance with claim 1 wherein each of the plurality of voltage drop measuring devices comprises a field effect transistor (FET).

3. The DC/DC boost converter in accordance with claim 2 wherein the FET comprises a FET from the group of a Gallium Nitride (GaN) FET, a junction FET, and a Metal Oxide Semiconductor FET (MOSFET).

4. The DC/DC boost converter in accordance with claim 1 further comprising a singular current sensor coupled to inputs of each of the plurality of similar phases for sensing a total input current.

5. The DC/DC boost converter in accordance with claim 4 wherein the boost converter controller is coupled to the singular current sensor for determining the total input current in response to a current signal from the singular current sensor, the controller further determining a ripple current at an input of each of the plurality of similar phases in response to the current signal from the singular current sensor and determining the predetermined times for measuring the voltage drop of each of the plurality of similar phases in response to the ripple current such that the voltage drop of each of the plurality of similar phases is measured at a middle of the ripple current to minimize an effect of the ripple current.

6. A method for balancing current for each of a plurality of similar phases of a DC/DC boost converter, the method comprising the steps of:
    measuring a voltage drop of each of the plurality of similar phases at predetermined times;
    calculating current information for each of the plurality of similar phases in response to the voltage drop measured for each of the plurality of similar phases;
    measuring a temperature of each of the plurality of similar phases; and
    balancing current for each of the plurality of similar phases in response to the current information and the temperature of each of the plurality of similar phases.

7. The method in accordance with claim 6 wherein the step of calculating the current information comprises the steps of:
    calculating an absolute current of each phase of the plurality of similar phases in response to the current information; and
    sensing a total input current,
wherein the step of balancing the current for each of the plurality of similar phases comprises the step of balancing the current for each of the plurality of similar phases in response to the voltage drop and the absolute current of each of the plurality of similar phases and the total input current.

8. The method in accordance with claim 7 further comprising the step of measuring a temperature of each of the plurality of similar phases, wherein the step of balancing the current for each of the plurality of similar phases comprises the step of balancing the current for each of the plurality of similar phases in response to the voltage drop, the measured temperature and the absolute current of each of the plurality of similar phases, and the total input current.

9. The method in accordance with claim 6 further comprising the steps of:
    determining the predetermined times for measuring the voltage drop of each of the plurality of similar phases in response to a middle of a ripple current received at an input of each of the plurality of similar phases,
wherein the step of measuring the voltage drop comprises the step of measuring the voltage drop of each of the plurality of similar phases at the middle of the ripple current to minimize an effect of the ripple current.

10. An electric motor system comprising:
    an electric motor;
    an inverter coupled to the electric motor and providing electric control therefor;
    an inverter controller coupled to the inverter for generating operational control signals and providing such operational control signals to the inverter;
    a first direct current (DC) voltage source for generating a first voltage and a first current;
    a DC bus coupled to the inverter for providing a second voltage to the inverter for the electric control of the electric motor by the inverter; and
    a DC/DC boost converter coupled to the first DC voltage source for generating the second voltage in response to the first voltage and the first current and providing the second voltage to the DC bus, the DC/DC boost converter comprising:
        a plurality of similar phases for boosting the first voltage to the second voltage, each of the plurality of similar phases having a current associated therewith and each of the plurality of similar phases including a corresponding one of a plurality of voltage drop measuring devices; and
        a boost converter controller coupled to the plurality of voltage drop measuring devices for generating and providing gate drive signals thereto and for measuring a voltage drop of each of the plurality of similar phases at predetermined times across each of the corresponding ones of the plurality of voltage drop measuring devices, the boost converter controller further coupled to the plurality of voltage drop measuring devices for calculating current information for each of the plurality of similar phases in response to the measured voltage drop of each of the plurality of similar phases, wherein the boost converter controller balances current for each of the plurality of similar phases in response to the current information of each of the plurality of similar phases.

11. The electric motor system in accordance with claim 10 wherein each of the plurality of voltage drop measuring devices comprises a field effect transistor (FET).

12. The electric motor system in accordance with claim 11 wherein the FET comprises and FET from the group of a Gallium Nitride (GaN) FET, a junction FET, and a Metal Oxide Semiconductor FET (MOSFET).

13. The electric motor system in accordance with claim 10 wherein each of the plurality of similar phases comprises a temperature sensing device for measuring a temperature thereof, and wherein the boost converter controller is coupled to the temperature sensing device of each of the plurality of similar phases and calculates the current information of each phase of the plurality of similar phases in response to the measured temperature and the measured voltage drop thereof.

14. The electric motor system in accordance with claim 10 wherein the DC/DC boost converter further comprises a singular current sensor coupled to inputs of each of the plurality of similar phases for sensing a summed current of the plurality of similar phases, wherein the current information is calculated by the boost converter controller in response to the summed current of the plurality of similar phases and the measured voltage drop of each of the plurality of similar phases.

15. The electric motor system in accordance with claim 10 wherein the boost converter controller senses a ripple current at an input of each of the plurality of similar phases and determines the predetermined times for measuring the voltage drop of each of the plurality of similar phases in response to the ripple current such that the voltage drop of each of the plurality of similar phases is measured at a middle of the ripple current to minimize an effect of the ripple current.

16. The electric motor system in accordance with claim 10 wherein the first DC voltage source is a first power supplying device, the electric motor system further comprising a second power supplying device coupled to the plurality of similar phases for receiving the second voltage generated thereby, the plurality of similar phases being coupled between the first power supplying device and the second power supplying device.

17. The electric motor system in accordance with claim 16 wherein the first power storage device is a fuel cell and the second power storage device is one or more of a capacitor and a battery.

18. The electric motor system in accordance with claim 10 wherein the electric motor comprises a permanent magnet electric motor.

\* \* \* \* \*